United States Patent
Bruns

(10) Patent No.: US 6,672,176 B2
(45) Date of Patent: *Jan. 6, 2004

(54) TORSIONAL SENSING LOAD CELL

(75) Inventor: Robert W. Bruns, Carmichael, CA (US)

(73) Assignee: Gagetek Technologies Holdings Company, Carmichael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,189

(22) Filed: May 1, 2001

(65) Prior Publication Data

US 2001/0018849 A1 Sep. 6, 2001

Related U.S. Application Data

(62) Division of application No. 09/351,866, filed on Jul. 12, 1999.

(51) Int. Cl.⁷ .................................................. G01L 1/16
(52) U.S. Cl. .................................................. 73/862.638
(58) Field of Search ...................... 73/862.636, 862.637, 73/862.638, 862.639

(56) References Cited

U.S. PATENT DOCUMENTS

| | | | |
|---|---|---|---|
| 3,589,180 A | 6/1971 | Kovacs | |
| 3,800,172 A | 3/1974 | Artin et al. | |
| 4,074,567 A * | 2/1978 | Horanoff | 73/147 |
| 4,127,028 A * | 11/1978 | Cox et al. | 73/32 A |
| 4,251,918 A * | 2/1981 | Duggan | 33/790 |
| 4,653,361 A | 3/1987 | Zobeli | |
| 4,706,506 A | 11/1987 | Lestelle | |
| 4,912,990 A * | 4/1990 | Norling | 73/862.59 |
| 5,166,571 A * | 11/1992 | Konno et al. | 310/321 |
| 5,303,593 A | 4/1994 | Kremidas | |
| 5,474,327 A | 12/1995 | Schousek | |
| 5,494,311 A | 2/1996 | Blackburn et al. | |
| 5,573,269 A | 11/1996 | Gentry et al. | |
| 5,635,642 A * | 6/1997 | Nonomura et al. | 73/504.16 |
| 5,657,941 A | 8/1997 | Simons et al. | |
| 5,747,691 A | 5/1998 | Yoshino et al. | |
| 5,872,319 A | 2/1999 | Bruns et al. | |
| 5,925,832 A | 7/1999 | Bruns | |
| 5,929,390 A | 7/1999 | Naito et al. | |
| 5,942,695 A | 8/1999 | Verma et al. | |
| 6,039,344 A | 3/2000 | Mehney et al. | |
| 6,069,325 A | 5/2000 | Aoki | |
| 6,092,838 A | 7/2000 | Walker | |
| 6,151,965 A * | 11/2000 | Watarai | 73/504.16 |
| 6,242,701 B1 * | 6/2001 | Breed et al. | 177/144 |
| 6,259,167 B1 | 7/2001 | Norton | |
| 6,323,444 B1 | 11/2001 | Aoki | |

* cited by examiner

*Primary Examiner*—Max Noori
(74) *Attorney, Agent, or Firm*—Townsend and Townsend and Crew LLP

(57) ABSTRACT

A torsional sensing load cell, particularly for mounting at support locations of an automotive seat in order to determine weight and sitting position of an occupant of a motor vehicle. The load cell has the shape of a tuning fork, with one arm fixed to a foot attached to a chassis and a second parallel arm, not contacting the first arm, arranged to support a quadrant of a seat by means of a flange on the side of the second arm, causing torsion in the arm. The two arms are connected at one end by means of a bridge section through which torsion is transmitted arising from twisting in the second arm. Torsion is measured by transducers on the bridge section with torsion signals converted to weight signals. The weight signals are used to control deployment of an air bag or other safety apparatus.

15 Claims, 10 Drawing Sheets

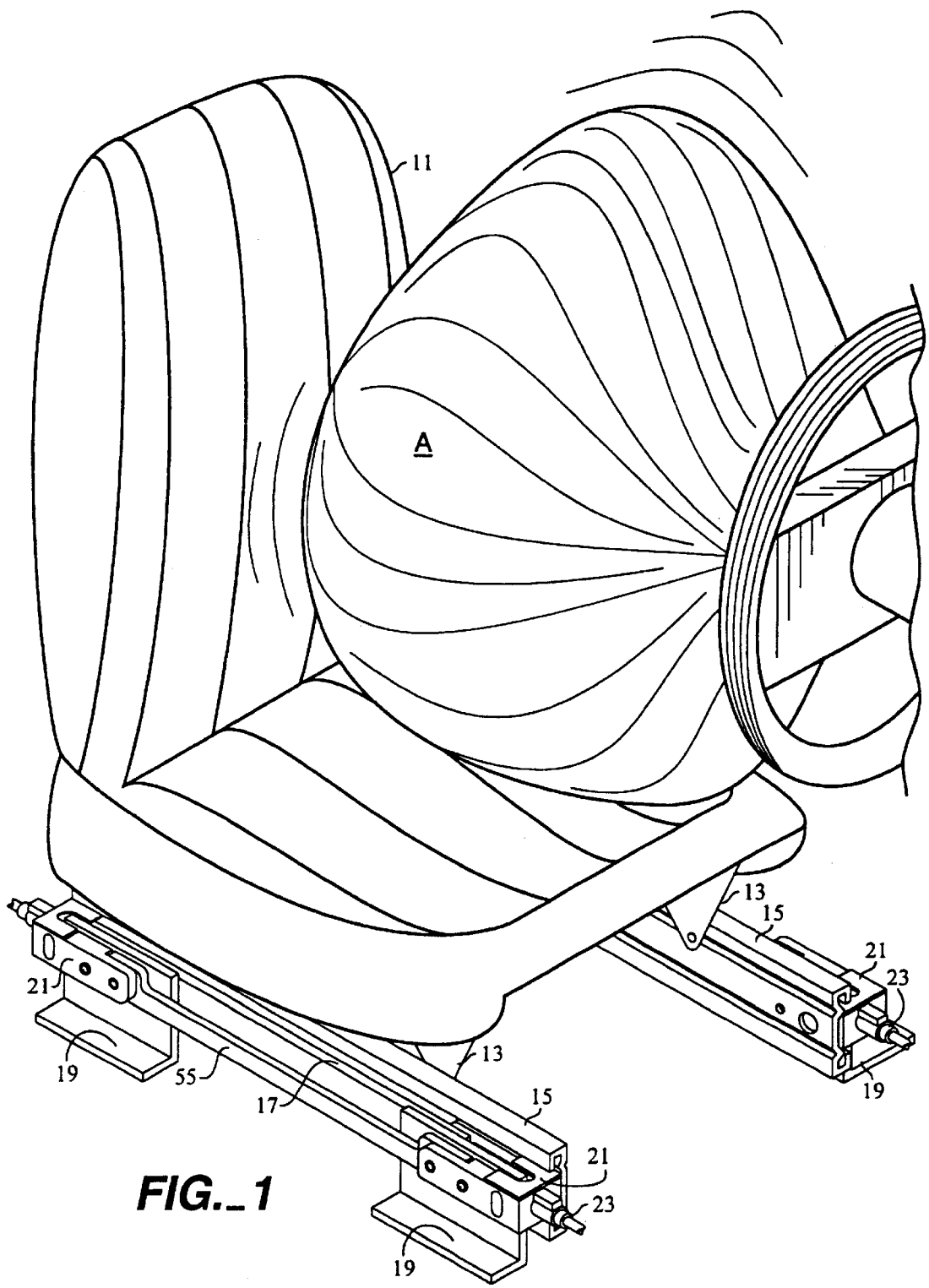
FIG._1

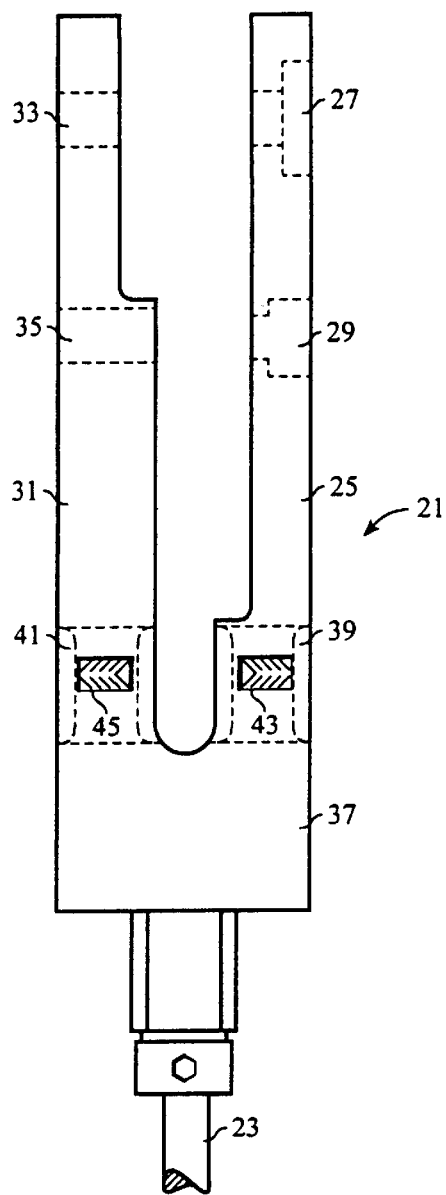
FIG._2
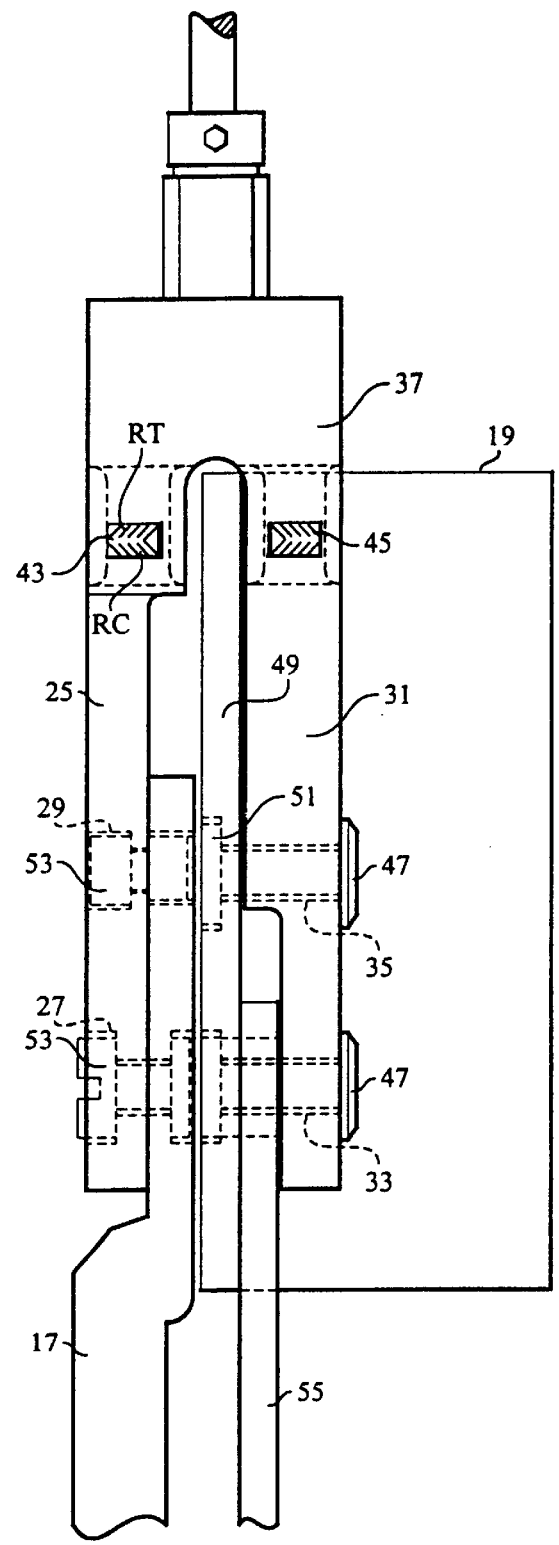
FIG._3A

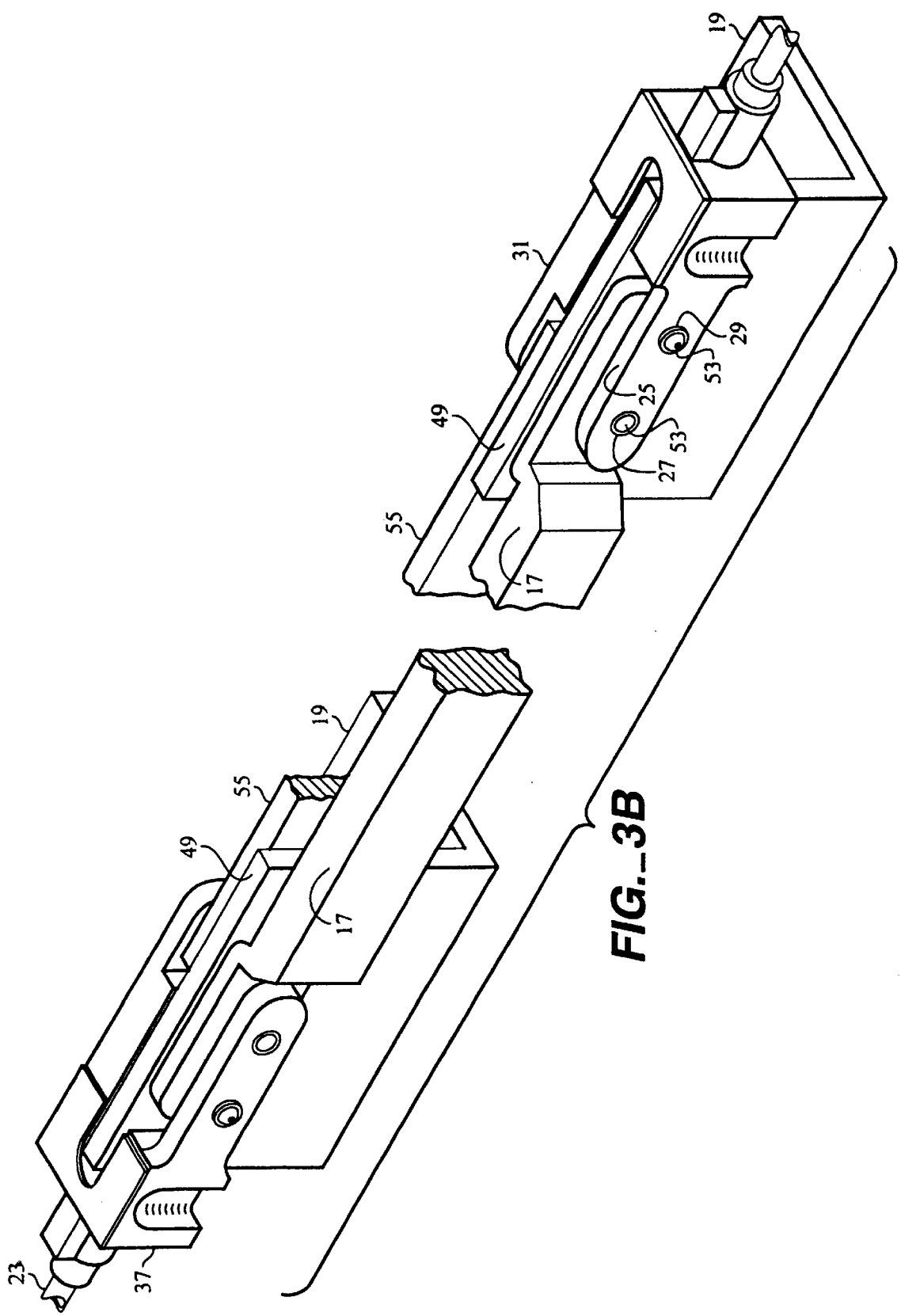

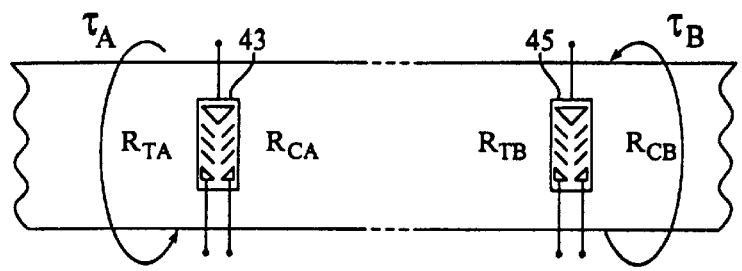
FIG._4A
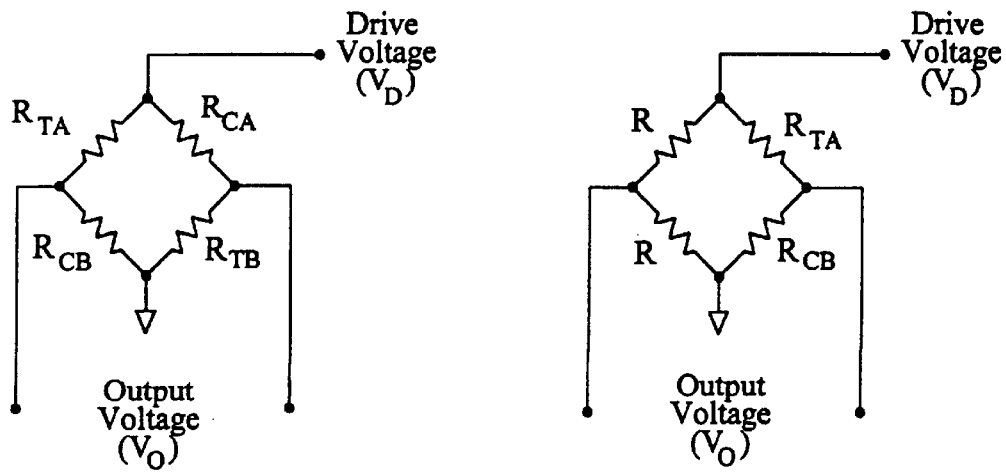
FIG._4B  FIG._5C
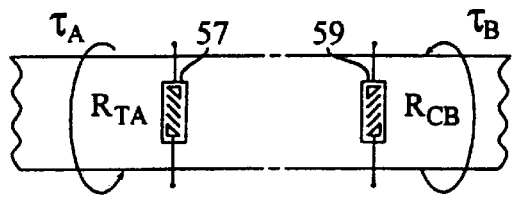
FIG._5A
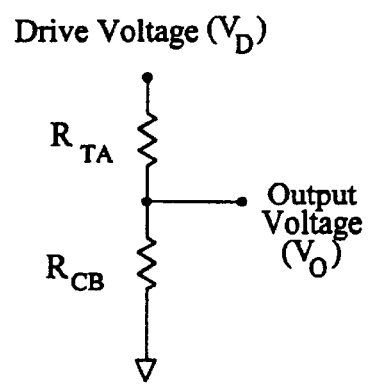
FIG._5B

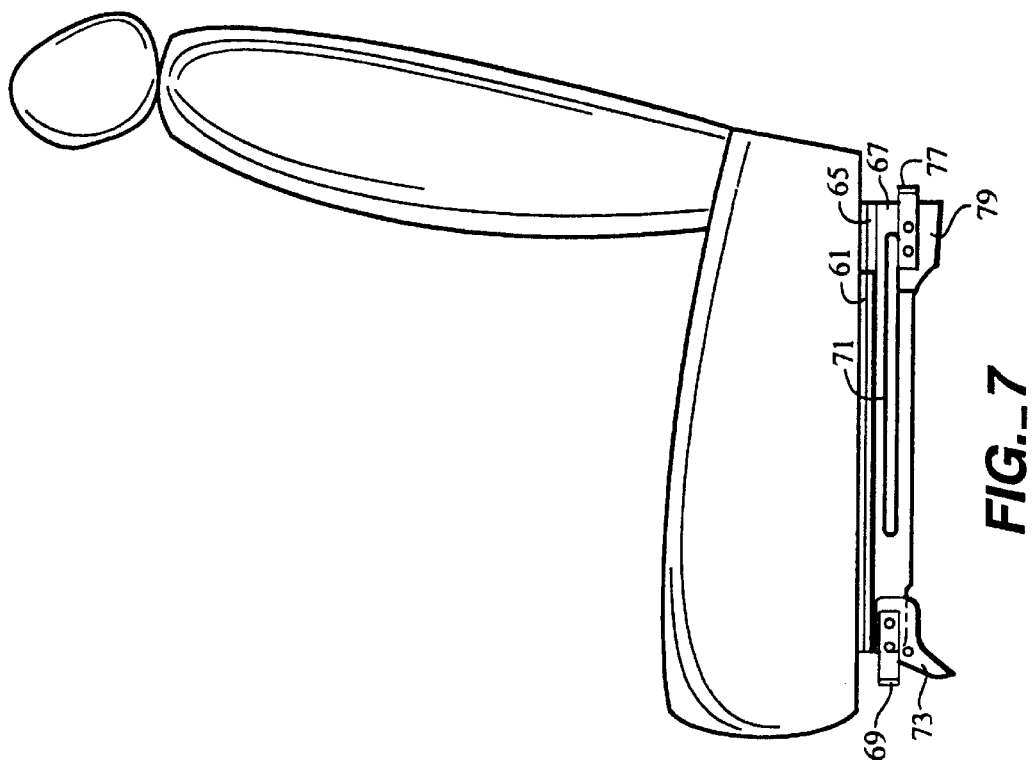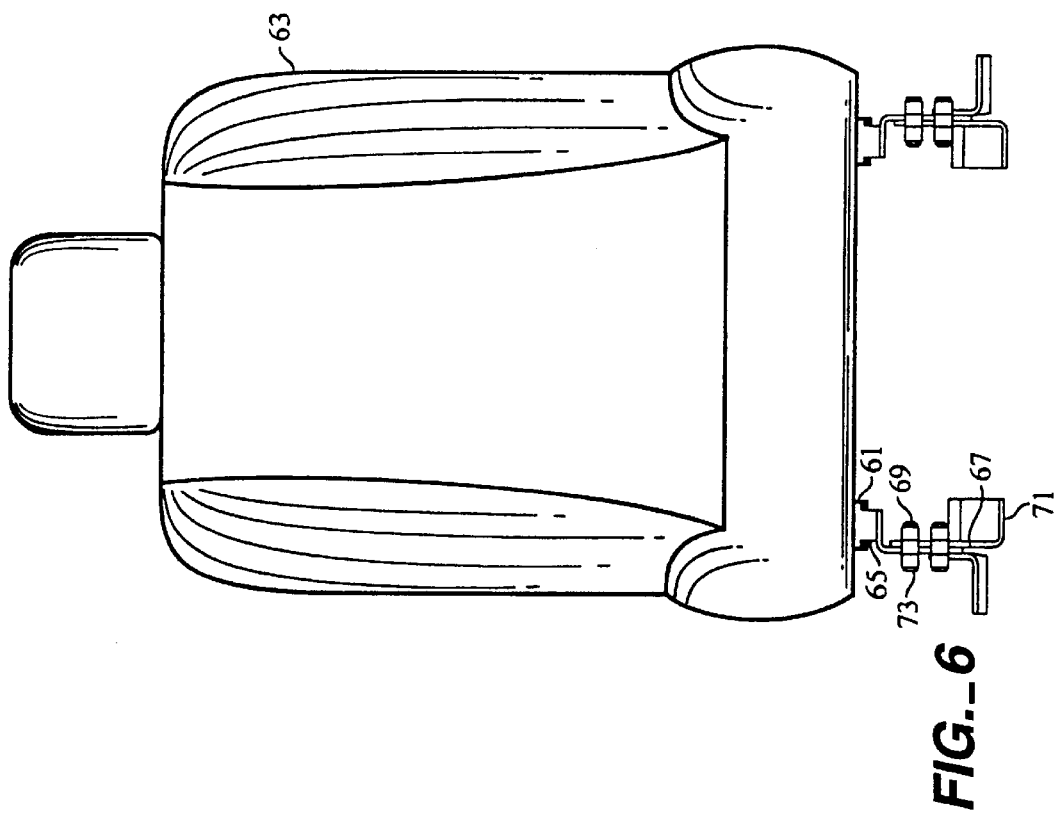

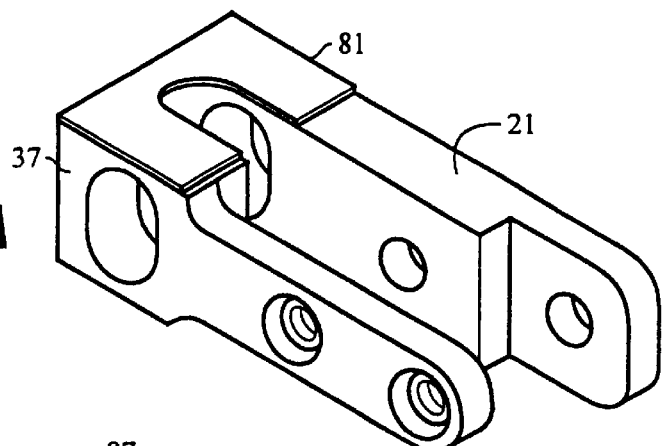
FIG._8A
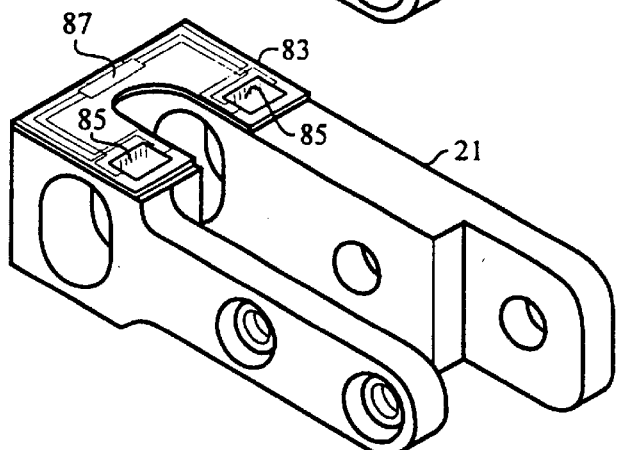
FIG._8B
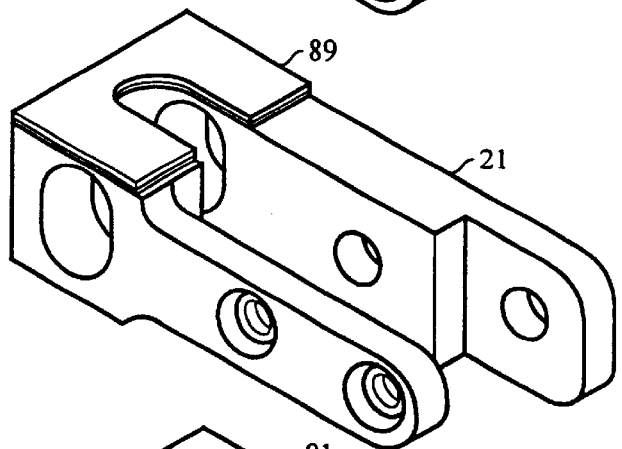
FIG._8C
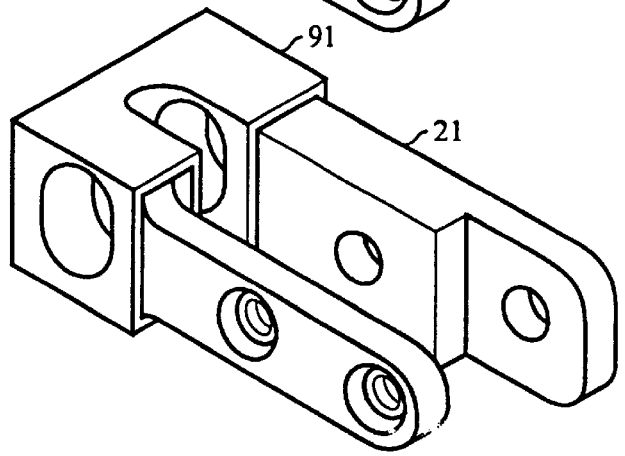
FIG._8D

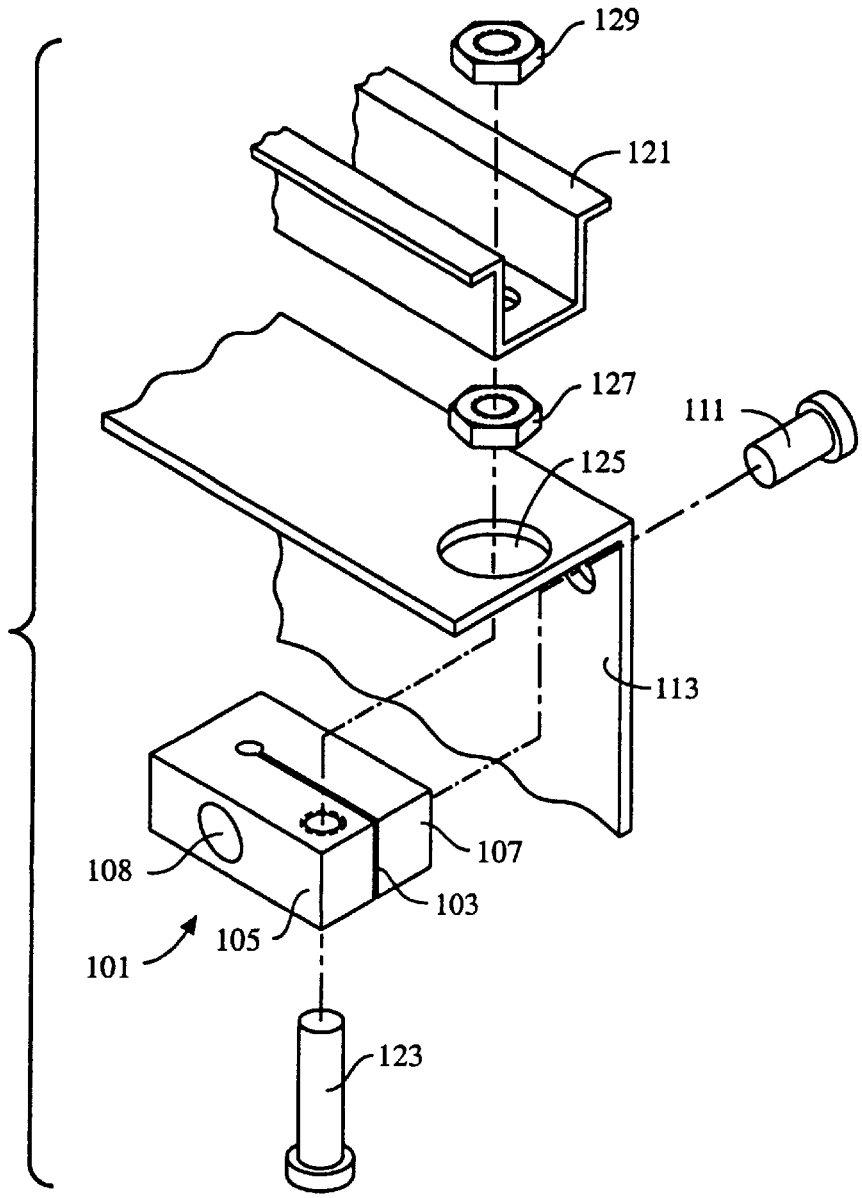
FIG._9

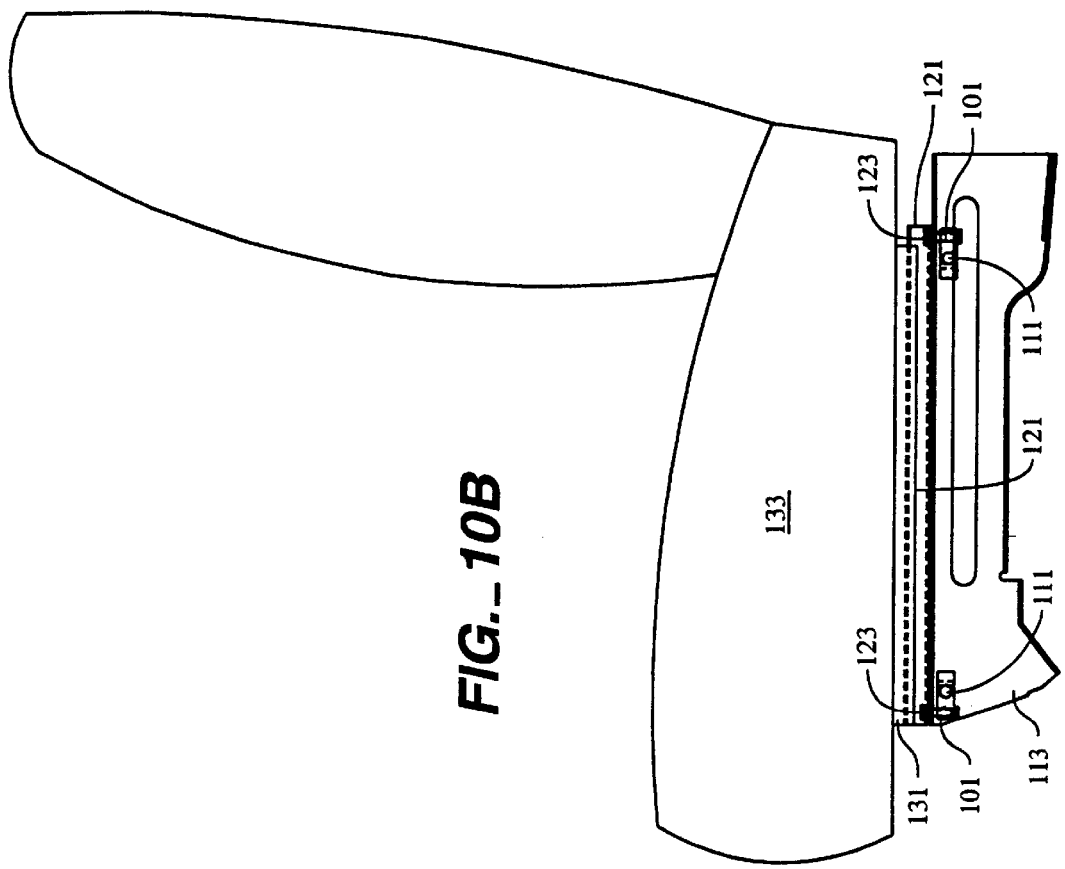
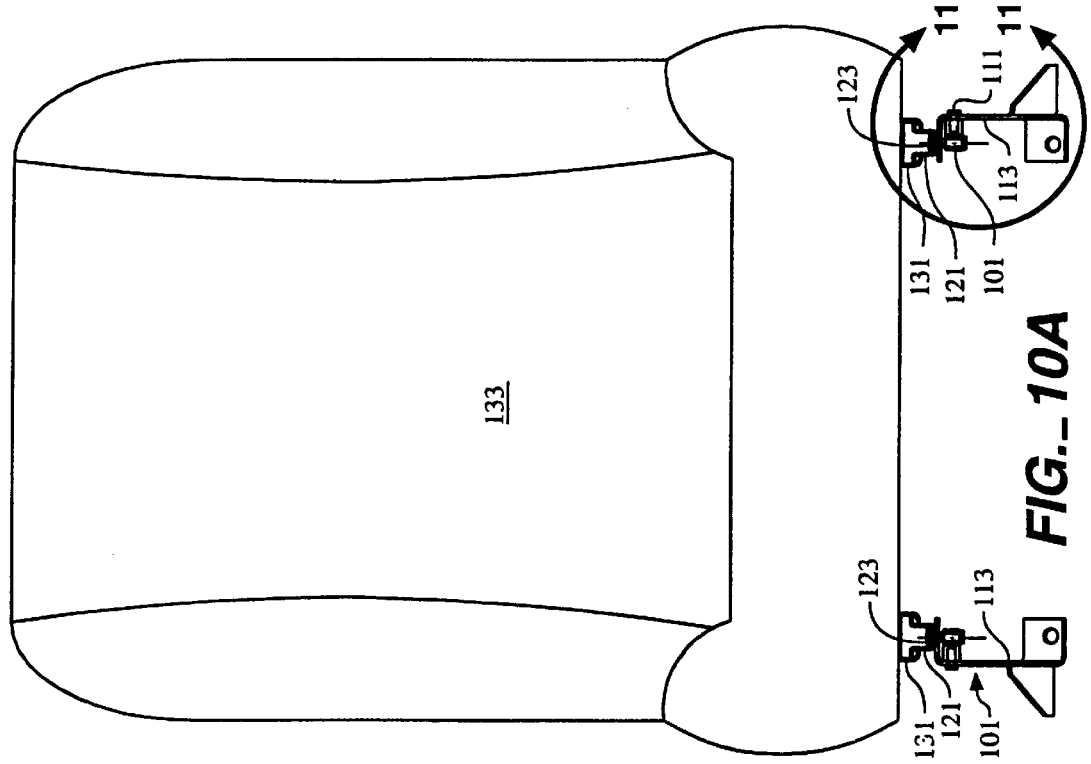

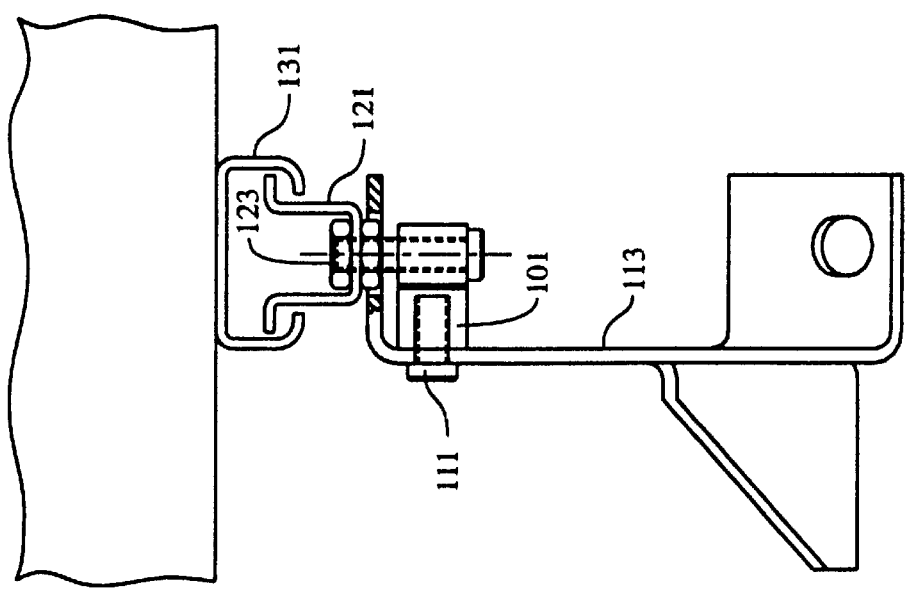
FIG._11
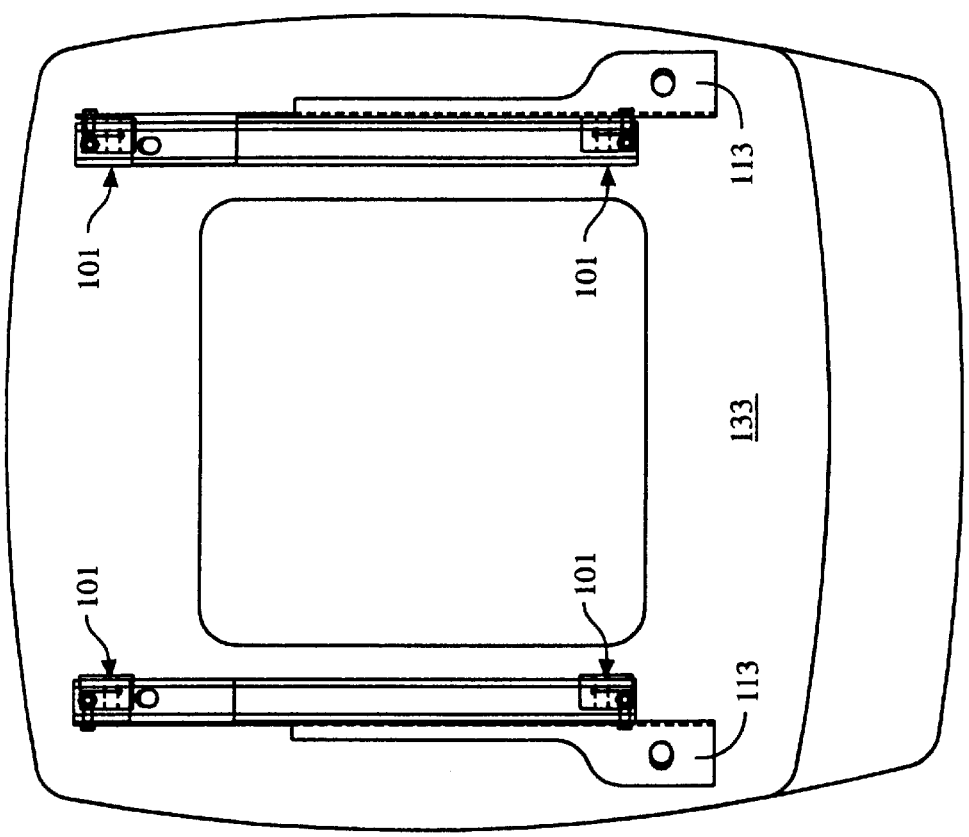
FIG._10C

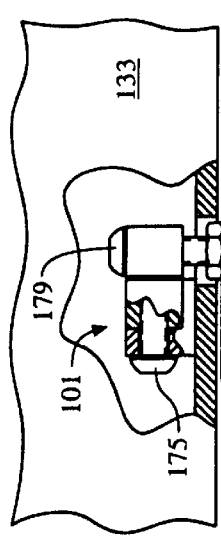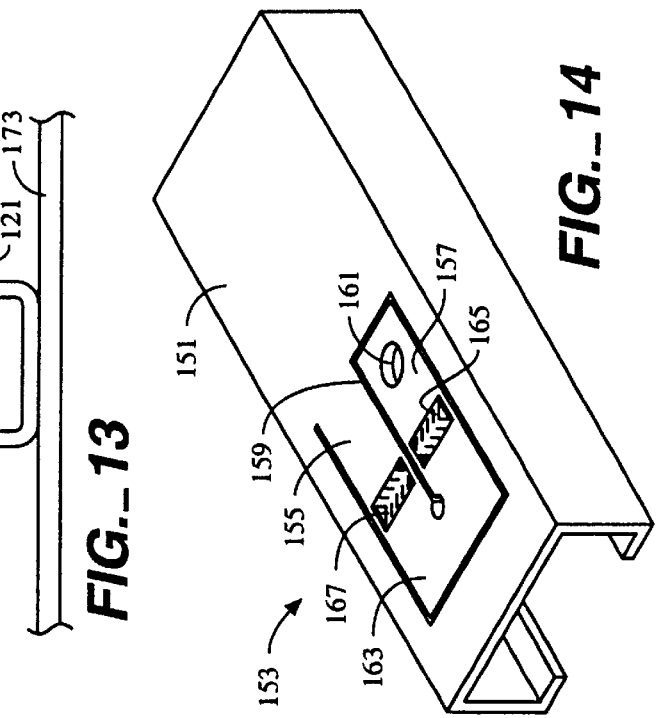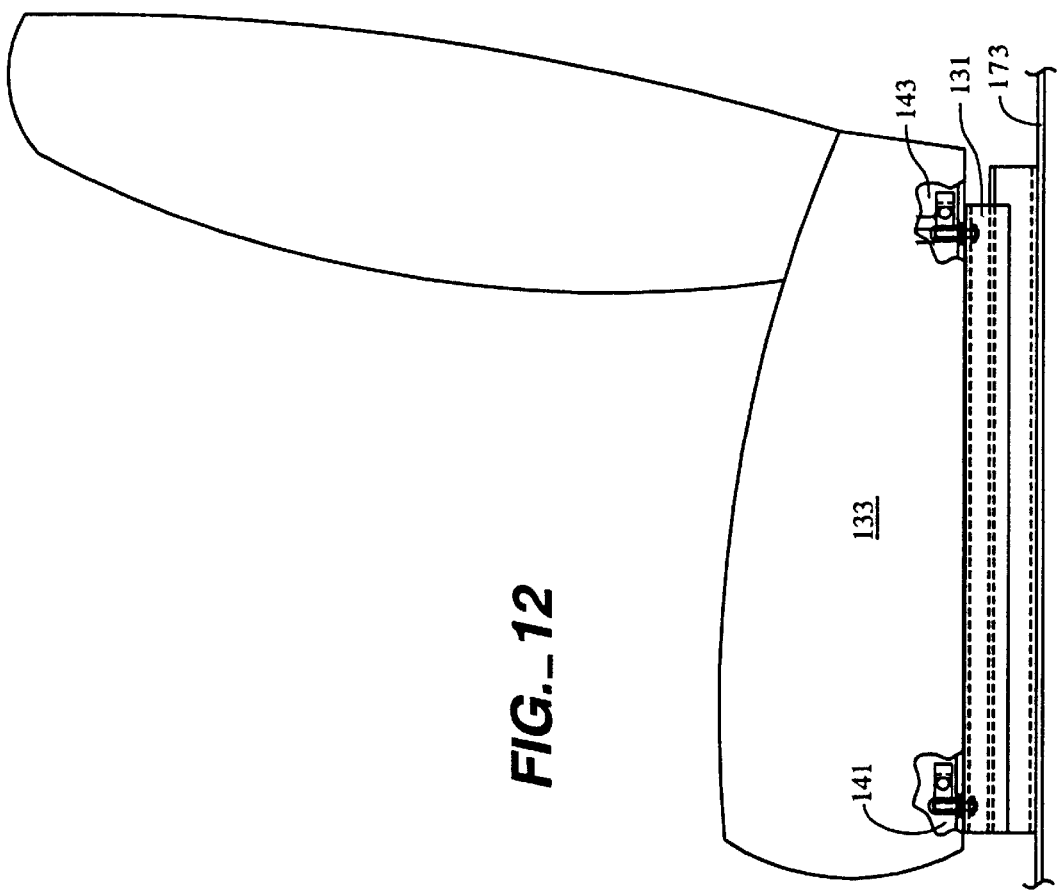

TORSIONAL SENSING LOAD CELL

CROSS REFERENCE TO RELATED APPLICATION

The present application is a divisional application of U.S. application Ser. No. 09/351,866, filed Jul. 12, 1999.

TECHNICAL FIELD

The invention relates to load cells, and in particular to load cells for use in sensing weight and position of a seated occupant in a motor vehicle for deployment of safety devices, such as air bags.

BACKGROUND ART

Since the development of the air bag and its inclusion in automobiles a problem has existed with the relative deployment force used for various individuals. Air bags have been a requirement on new vehicles since 1992. Air bags are made to arrest the forward momentum of the driver or passenger in the event of a collision. If one designs a universal air bag for all passengers, then it must have sufficient force to stop the largest of the expected passengers. Smaller passengers have less momentum, and so do not require the same momentum change as the larger passenger. In addition, smaller passengers are shorter, and sit closer to the dashboard, and therefore experience more of the bag's explosive force than a average adult male, sitting further back. As a result of the current air bag deployment force, there have been a number of injuries and fatalities associated with air bag deployment. As of mid 1998, 105 deaths have been attributed to the deployment of air bags with a small adult or a young child when no air bag deployment would not have resulted in any injury to the occupant.

This situation has caused NHTSA, the National Highway Traffic Safety Administration, a branch of the U.S. Department of Transportation, to propose rules which will change the criteria for air bag activation, as well as the deployment force, in order to protect such small occupants. In addition to these requirements, the NHTSA has also identified "out of position" occupants as a source of concern. Thus a system must be able to modulate or reduce the air bag deployment force if the occupant is in a position so as to be injured by the air bag, even if that occupant is a full size adult.

There are several methods which can sense the presence and weight of an occupant. In U.S. Pat. No. 5,573,269, Gentry et al. teach an apparatus which uses weight measurements, using a sensor, in an automobile seat as an input to a controller which operates air bags. This sensor, described in U.S. Pat. No. 5,494,311, is a thin structure that resides in the bottom seat cushion. As is recognized by Gentry, much of the occupant's weight is also directed into the seat back, thereby bypassing the weight sensing pad and traveling directly through the seat structure to the chassis of the vehicle. An incline sensor, which measures the tilt of the back of the seat is also provided to compensate for this effect.

There are two problems with this system. First it assumes that the weight can be determined only by the pressure on the seat cushion bottom and by the angle of the seat. That is not always the case. Consider an occupant who puts horizontal pressure on the floorboard in front of the seat. This increases the force on the back with a resulting decrease on the bottom cushion. At some point this pressure can be great enough that nearly all of the occupants weight is on the back cushion. This problem is also present in U.S. Pat. No. 5,474,327. In this device a set of pressure sensitive pads is placed beneath the surface of the seat cushion. While this device is adequate for the detection of a child seat, it does not give adequate information for small adults and out of position occupants.

Blackburn et al. teaches in U.S. Pat. No. 5,494,311 a system where pads are placed in both the lower and rear seat cushion. This gives a better weight measurement under all conditions, the obvious downside is the cost.

One of the problems of prior systems is that they cannot read negative weight, i.e. when forces are present that would cause the force on the seat support to go negative. This can occur when the occupant places force, via his feet, on the front of the passenger compartment.

Yet another difficulty is that since the pressure is sensed on the seat, the seat belt tension adds to the reading. A 40 pound car seat could then, with sufficient tension on the seat belt, put 200 pounds of force on the seat surface, causing a false reading.

An object of the invention is to devise an apparatus for accurately sensing weight of an occupant in an automotive seat for deployment of restraint devices.

Another object of the invention is to determine where a passenger is seated in an automotive seat.

SUMMARY OF THE INVENTION

The above object has been achieved with a torsional sensing load cell having the shape of a tuning fork with two arms. In an automotive application, one arm of the cell supports part of the load of a car seat and the other arm is fixed to a foot attached to the automotive chassis. Torsion exists in the load cell as the load arm deflects relative to the fixed arm. A pair of strain gauges measure the torsion in the load cell and produce an electrical signal which is reported to a circuit which converts the electrical signal to a weight measurement. By placing a load cell at each of four corners where car seat support feet are located, the entire load in a car seat can be measured and the position of a seated person can be determined by observing weight distribution among the four corners of the seat. Since the support feet are insensitive to the manner in which loads are generated, the load cells sense true load, even where unexpected loads are created, for example by a car passenger pushing against a dashboard by means of his feet.

An automotive car seat is usually moveable by means of an electric motor and is not directly mounted to the automobile chassis. Rather, the car seat is mounted on two parallel moveable glide rails which are movably supported on rollers by two parallel fixed guide rails. The guide rails are fixed in place by rigidly connecting each guide rail between two support feet, one at the front of a seat and one at the back. The moveable glide rails transmit force to the fixed guide rails. Since the load cells of the present invention link the fixed guide rails to the fixed feet, torsion is allowed to develop between a guide rail and a fixed foot. Torsion then exists in the bridge section of the load cell, between the two arms of the load cell. Here is where strain gauges are mounted for torsion measurement. Electrical signals generated by the strain gauges are sent to a circuit which produces a force signal. Signals from four load cells associated with an automotive seat are directly proportional to the weight of an occupant in the seat. The fractional distribution of weight between forward load cells associated with the front of the seat and rearward load cells associated with the rear of the seat indicate where an occupant is seated.

BRIEF DESCRIPTION OF THE DRAWINGS

FIG. 1 is a perspective view of an automobile seat employing the apparatus of the present invention using a vertical rail support.

FIG. 2 is a top view of the apparatus of the present invention.

FIG. 3A is a top view of the apparatus of FIG. 2 attached to fixed automotive structures.

FIG. 3B is a perspective view of the apparatus of FIG. 2.

FIGS. 4A–4B and 5A–5C are schematic diagrams of the bridge circuitry coupling the transducers shown in FIG. 3 to output lines.

FIG. 6 is a front view of an automobile seat employing an alternate embodiment of the apparatus of the present invention using a horizontal rail support.

FIG. 7 is a side view of the apparatus of FIG. 4.

FIGS. 8A–8D are top diagrammatic views of a process for making the present invention.

FIG. 9 is an exploded perspective view of an alternate embodiment of the apparatus of FIG. 2.

FIGS. 10A–10C are front, side, and bottom views of the load cell of FIG. 9, mounted to an upright support for an automotive seat within the support structure.

FIG. 11 is a detail of a load cell mounting taken along lines 11—11 in FIG. 10A.

FIG. 12 is a side view of the load cell of FIG. 9 mounted within an automotive seat above an automotive seat support structure.

FIG. 13 is a front, partial cataway, detail view of the load cell mounting shown in FIG. 12.

FIG. 14 is a perspective view of another alternate embodiment of the load cell of FIG. 2.

BEST MODE FOR CARRYING OUT THE INVENTION

With reference to FIG. 1, an automotive car seat 11 is seen connected by flanges 13 to moveable glide rails 15. The flanges are connected to sides of the glide rail so that weight from a quadrant or portion of the seat causes a slight amount of twisting of the rail, proportional to weight on the seat. The glide rails move in a telescopic relation relative to fixed guide rails 17, with bearings or rollers transferring the load from the glide rails to the fixed guide rails. The fixed guide rails are supported by feet 19 which are fixed to an automotive chassis or similar structure. Each of the feet 19 is an L-shaped bracket with a base welded or bolted to the chassis and an upwardly extending portion which is welded or bolted to the guide rail.

Each guide rail 17 is C-shaped and is housed partially within a larger glide rail 15, so that the glide rail slides over the guide rail in the embodiment of FIG. 1. Other geometries are possible as will be seen below. A motor (not shown), carried by car seat 11, moves the glide rail relative to the guide rail, using a gear which engages a gear rail 55 that is fixed and parallel to the guide rail.

Weight or downward force on seat 11, carried by the rail system is transferred to the feet by means of the torsional sensing load cell 21 of the present invention. The torsional sensing load cell is the only connection between the rail support system for the automotive car seat 11 and the feet 19. The torsional sensing load cell has transducers which measure a torsional force and produce an electrical signal carried by cable 23. The purpose of the load cells is to measure the torsional force on seat 11 applied by a seated person in order to apply the appropriate amount of gas pressure to an air bag A or similar safety device. If the seated person is of very low weight, it is assumed that the person is a child and the air bag A is not deployed. Air bag deployment based upon seat weight is known, as previously described, but by different mechanisms.

With reference to FIG. 2, torsional sensing load cell 21 is a metallic bar, preferably steel, but also aluminum or titanium, with a generally rectangular cross section, seen to have the shape of a small tuning fork with a first arm 25, having a pair of mounting holes 27 and 29 therein, spaced apart from a second arm 31, also having a pair of mounting holes 33 and 35. Although the holes in the two arms are aligned for manufacturing ease, bolts passing through one arm do not contact the other arm. Rather, each arm is independent of the other so that torsion can develop through the load cell and across the bridge section connecting the two arms. The actual size of the torsional sensing load cell is slightly smaller than tuning forks commonly used in piano tuning, approximately one inch in overall width by 0.625 inches in height by almost 3 inches in length. The cell may be stamped, cast or forged. The arms 25 and 31 are joined by a bridge section 37. The transition zones 39 and 41, indicated by dashed lines, where the bridge section 37 joins the arms 25 and 31 serve as places for surface mounting of strain transducers 43 and 45. The bridge section may have cut-outs for mass relief. The cut-outs may define I-beam shapes so that mass relief does not affect structural strength. Each strain transducer is able to sense torsion of the underlying member and produce an electrical signal representative of the strain. The electrical signal is carried out by cable 23 for both strain transducers.

In FIGS. 3A and 3B the second arm 31 is seen to be fixed to foot 19 by means of bolts 47 which are secured to an upwardly extending portion of foot 19, namely riser 49. It is important to note that second arm 31 is fixed relative to an automotive chassis to which foot 19 is connected. On the other hand, first arm 25 may be considered to receive cantilever support from the first arm and is connected to guide rail 17 by means of bolts 53. Weight on the seat is transferred to the guide rail 17, as explained above, which in turn transfers the weight to the riser 49 with some twisting or torsion of the torsional sensing load cell. Note that there is a slight amount of clearance, roughly one millimeter, between the guide rail 17 and riser 49. The clearance is necessary to allow for independent movement of first arm 25 relative to second arm 31 as the first arm provides cantilever support to guide rail 17. It is this independent movement which creates a torsion through the load cell. Gear rail 55 may be seen to be connected to second arm 31. The torsion in the bridge section 37 is reported by the two strain transducers 43 and 45 which are connected in a differential electrical circuit, known as an electrical bridge.

In FIG. 4A, transducers 43, 45 each comprises two sets of strain elements $R_T$, $R_C$ arranged in a ninety degree chevron pattern, which is a standard configuration for strain gauges used to measure strain on the surface of a member under load, and are mounted relative to a neutral axis of the sensing member. In the presence of a torsional stress, each transducer 43, 45 will be subject to a stress $\tau_A$, $\tau_B$ respectively, such as shown in FIG. 4A. The actual direction of the stresses will vary depending on the position of the load with respect to locations A and B. For any loading situation, however, one set of strain elements of transducer 202 (e.g. $R_{TA}$) will be in tension while the other set of-strain elements (e.g. $R_{CA}$) is in compression. The strain elements $R_{TB}$, $R_{CB}$ comprising transducer 45 are similarly stressed. The strain elements of both transducers are coupled in a Wheatstone bridge, such as shown in FIG. 4B, where similarly strained elements are located on opposite legs of the bridge. The gauges are powered by approximately 7 mA of current. The differential output signal $V_o$ is characterized by $$V_O = V_D\left(\frac{R_{CB}}{R_{TA} + R_{CB}} - \frac{R_{TB}}{R_{CA} + R_{TB}}\right) \quad \text{Eqn. 1}$$

However, since $R_{CB}$ and $R_{TB}$ are oppositely strained, the difference signal actually represents a summation of the torsional stresses sensed at both transducers 43, 45, namely $\tau_A + \tau_B$.

FIG. 5A shows an embodiment using left and right transducers 57, 59 which have a simpler construction. Here, each transducer comprises only a single set of strain elements, rather than the chevron pattern of FIG. 4A. FIG. 5B shows a voltage divider circuit used for such transducers. In this case, the output signal is defined by the voltage divider equation which characterizes the circuit. Unlike the bridge circuit of FIG. 4B, the circuit of FIG. 5B provides an output signal that is directly proportional to the torsional stress experienced by a single transducer, namely $$V_O = V_D\left(\frac{R_{CB}}{R_{TA} + R_{CB}}\right) \quad \text{Eqn. 2}$$

This embodiment produces a smaller output signal than the embodiment of FIG. 4A. However, a differential signal can be generated by using the circuit of FIG. 5C which comprises a pair of fixed resistances R used in conjunction with $R_{TA}$ and $R_{CB}$ in a bridge configuration. The equation which characterizes this circuit is $$V_O = V_D\left(\frac{R}{2} - \frac{R_{TB}}{R_{CA} + R_{TB}}\right) \quad \text{Eqn. 3}$$

In all equations, the output signal, $V_o$, is proportional to force on the seat or weight. By calibration, the constant of proportionality may be determined so that true weight is known. This alternate embodiment, however, lacks the sensitivity afforded by that shown in FIG. 4A. The embodiment of FIG. 5A, nonetheless, offers the advantage of being simpler and less costly to manufacture, and therefore under the right circumstances may be preferable over the embodiment of FIG. 4A.

FIG. 6 illustrates a preferred embodiment of the apparatus of the present invention in which the glide rail 61 is connected to automotive seat 63. The glide rail slides over a guide rail 65, being separated by bearings which transfer the load from the seat, through the glide rail and to the bearings and thence, the guide rail. The guide rail is mounted to a fixed foot 67 through a torsional sensing load cell 69 of the present invention. The load cell has the configuration previously described with reference to FIG. 3, with one arm of a tuning fork shaped load cell connected to the fixed rail and the other arm connected to the fixed foot 71. The relationship between the glide and guide rails has been reversed compared to the embodiment of FIG. 3. The torsional sensing load cell has a pair of bolts 73, one of which holds one arm of the cell to the fixed foot, while another bolt secures the second arm to the fixed rail.

In the side view of FIG. 7, an overlapping fixed flange 73 is seen having a leg 75 protruding downwardly for contact with automotive upholstery or matting and partially shielding the torsion cell from accidental damage and contact with objects. The forward load cell 69 is seen spaced apart from the rearward load cell 77 which also has an overlapping fixed flange 79 which partially shields the rearward load cell. Glide rail 61 may be seen above guide rail 65, with support from fixed foot 71. The fixed flange 79 also makes contact with automotive upholstery or matting. The position for four load cells is apparent because left and right side views of the seat support structure would be identical.

The transducers used in the apparatus of the present invention may be manufactured in-situ, on the load cell. In FIG. 8A the torsional sensing load cell 21 is seen to have a generally tuning fork shape with bridge section 37 having a flat top which is coated with an electrically insulative epoxy or epoxy-glass layer 81 which is several millimeters thick. Next, using photomask and etching processes, a desired circuit pattern 83 is deposited as one or more layers having a thickness of only a few millimeters upon the insulative layer, as shown in FIG. 8B. The desired strain gauge transducers 85 with chevron elements at 90 degrees are also deposited in the same manner as microcircuits are placed on small circuit boards in electronics fabrication. A terminating header 87 is deposited to make contact with a cable which carries away electrical signal from the transducers. Next, an electrically insulative cover layer 89 is disposed over the circuit pattern, as shown in FIG. 8C. The insulative layer closely adheres to the circuit pattern and is typically epoxy. Lastly, a tough encapsulant shell 91 is formed over the entire bridge section. The encapsulant is selected from known potting materials or may be a thick shell of epoxy as shown in FIG. 8D.

With reference to FIG. 9, load cell 101 is seen to be a metallic block, preferably steel, but also aluminum or titanium. The block is split by a narrow slot 103 resembling a saw cut which defines two independent linear arms 105 and 107. A first mounting hole, not seen, allows a bolt 111 to fasten the load cell to a fixed riser 113. Bolt 107 is secured to linear arm 107 but does not contact linear arm 105. One or more mass relief holes may be provided. Torsion between the linear arms is measured by transducers 117 and 119 which operate in the same manner as the transducers described above. An automotive seat, not shown, carries a glide rail, also not shown. The glide rail transfers force to the fixed guide rail 121 which is connected to the fixed riser 113 by means of a bolt 123 which extends through hole 125 in arm 105. The bolt also passes through hole 125 in the fixed riser 113 where it is held in place by a first nut 127. A second nut 129 secures bolt 123 after it passes through the guide rail 121.

In FIGS. 10A–10C, as well as FIG. 11, riser 113 may be seen mounting the load cell 101 with a horizontal bolt 111 passing through both the riser and into the load cell 101. The vertical bolt 123 secures the load cell to guide rail 121 which is held fixed relative to riser 113. A glide rail 131 is a C-shaped member carrying an automotive seat 133 which slides over the guide rail 121. Weight is transferred from seat 133 to the glide rail 131 and then to the guide rail 121. Force is then transmitted by means of bolt 123 through the fixed riser 113 and to one arm of load cell 101. In FIG. 10C, the load cell 101 is seen having bolt 123 connected to one arm of the load cell. Bolt 111 is seen connected to the other arm.

With reference to FIGS. 12 and 13, automotive seat 133 rests on glide rails 131 connected to guide rails without any upright risers 113. In FIG. 12, the load cells are seen to be located at the corners 141, 143 of the seat. Load cells are also located at the two opposite corners, not seen. By placing cells at the corners of the seat, the weight on the automotive seat may be determined in a manner which indicates how much force is on the rearward part of the seat and how much force is on the forward portion. This would give an indication of how to deploy an air bag. If most of a person's weight appears at the forward edge of a seat, less deployment force should be used than for a person whose weight is evenly distributed on the seat or whose weight is mostly toward the rear of the seat.

In FIG. 13, the glide rail having the load cell mounted above is seen to be mounted over guide rail 121 which is fixed to an automotive floor 173. No riser is used. The fixed guide rail 121 allows the glide rail 131 to move over it by means of a motor and a third rail, not shown, but described above. An automotive seat 133 mounts the cell 101 by means of a bolt 175 which extends into one of the linear arms of the cell. A bolt 179 passes through the other linear arm of the load cell and is secured to the top of glide rail 131. A pair of nuts on either side of the glide rail top retain bolt 179 in place. In this manner the load on an automotive seat may be measured.

In FIG. 14, the glide rail 151 is seen to have load cell 153 integrated into the rail. A first linear arm 155 of the cell is separated from a second linear arm 157 by a spiral slot 159 so that one arm supporting the weight of an automotive seat through hole 161 may transmit force to the linear arm 157, across bridge 163 and to the other linear arm 155 which is held fixed to glide rail 151. On the other hand, linear arm 157 is not fixed but is free to move and deliver torsional forces to bridge 163, measured by transducers 165 and 167. The integrated load cell of FIG. 14 operates in the same manner as the load cell of FIG. 9.

Although the embodiments of the invention have been described with reference to an automotive seat, nothing limits use of the invention to automotive applications. It is clear that the torsional sensing load cell of the present invention could be used with other seats or other types of loads. One of the advantages of the present invention is that the manner of loading the seat is not relevant. For example, a seat occupant may have his or her feet on the dashboard, increasing the seat load, or may be reclining so that seat loading is reduced. The present invention accurately reports actual seat load by use of transducers connected to support feet for the seat.

As mentioned above, the amount of weight on forward cells can be compared with the amount of weight on rearward cells to determine whether a seated occupant is seated at the forward edge of a car seat or is seated toward the center of the car seat. This information is used to control the amount of gas flowing into an air bag to protect an occupant seated at the forward edge of a seat or to protect an occupant of low weight, such as a child.

What is claimed is:

1. A torsional sensing load cell for use as a force indicator comprising:
    a first arm held in a relatively fixed position,
    a second arm, parallel to the first arm, connected to a load associated with a force,
    a joining section integrally connected to an end of said first arm and to an end of said second arm,
    a force transducer connected to produce an electrical output signal representing torsion between the first and second arms, and
    an electrical circuit connected to receive said output signal representing torsion and to use said signal to indicate the load associated with a force,
    wherein the load is connected to the second arm in a manner to produce torsion between the first arm and the second arm thus producing torsion in the joining section.

2. The apparatus of claim 1 further defined by the force transducer comprising a pair of spaced apart strain gauges, one strain gauge associated with each of the first and second arms.

3. The apparatus of claim 1 wherein the first and second arms and joining section have a tuning fork shape.

4. The apparatus of claim 2 wherein said joining section has an axis of symmetry and said strain gauges are symmetrically located relative to the center line.

5. The apparatus of claim 1 wherein the first arm is connected to a post anchored to a rigid platform.

6. The apparatus of claim 5 wherein said rigid platform is part of a vehicle.

7. The apparatus of claim 6 wherein said vehicle is a motor vehicle, said post is a fixed foot rising above said platform.

8. The apparatus of claim 1 wherein the first and second arms are integrated into a supporting rail.

9. The apparatus of claim 1 wherein the first and second arms each has a linear geometry.

10. A torsional sensing load cell comprising:
    a first member;
    a second member;
    a third member integrally coupling together the first and second members, wherein the first member and second member are configured to be coupled to a load in a manner to produce torsional stress in the first, second, and third members;
    a first force transducer connected to the first member detect torsional stress in the first member; and
    a second force transducer connected to the second member to detect torsional stress in the second member.

11. The load cell of claim 10 wherein the first, second, and third members are arranged in the shape of a tuning fork.

12. The load cell of claim 10 wherein the first, second, and third member are defined by a continuous slot formed through a thickness of a solid material, the slot tracing a shape which outlines the first, second, and third members.

13. A torsional sensing load cell comprising:
    a generally U-shaped member having a main body portion and first and second extending portions extending away from the main body portion;
    a first transducer coupled along the first extending portion and proximate the main body portion; and
    a second transducer coupled along the second extending portion and proximate the main body portion,
    the first extending portion and the second extending being coupled to a load in a manner to produce torsional stress through the generally U-shaped member when subjected to the load,
    the first and second transducers configured to detect a torsional force respectively in the first extending portion and the second extending portion resulting from the torsional stress.

14. The load cell of claim 13 wherein the first and second extending portions are substantially coplanar.

15. The load cell of claim 13 wherein the main body is subject to torsion when opposing forces are applied to the first extending portion and to the second extending portion.

* * * * *